United States Patent
Wang

(10) Patent No.: US 11,906,637 B2
(45) Date of Patent: Feb. 20, 2024

(54) PRECISE POINT POSITIONING (PPP)-BASED REAL TIME KINEMATIC (RTK) CORRECTION

(71) Applicant: QUALCOMM Incorporated, San Diego, CA (US)

(72) Inventor: Min Wang, Tustin, CA (US)

(73) Assignee: QUALCOMM Incorporated, San Diego, CA (US)

(*) Notice: Subject to any disclaimer, the term of this patent is extended or adjusted under 35 U.S.C. 154(b) by 161 days.

(21) Appl. No.: 17/455,630

(22) Filed: Nov. 18, 2021

(65) Prior Publication Data

US 2023/0152472 A1 May 18, 2023

(51) Int. Cl.
  *G01S 19/40* (2010.01)
  *G01S 19/43* (2010.01)

(52) U.S. Cl.
  CPC ............ *G01S 19/40* (2013.01); *G01S 19/43* (2013.01)

(58) Field of Classification Search
  CPC .. G01S 19/04; G01S 19/071; G01S 19/32–33; G01S 19/40; G01S 19/43
  See application file for complete search history.

(56) References Cited

U.S. PATENT DOCUMENTS

| | | | | |
|---|---|---|---|---|
| 2014/0043187 A1* | 2/2014 | Ellum | ...................... | G01S 19/04 342/357.27 |
| 2015/0168560 A1* | 6/2015 | Ralphs | .................... | G01S 19/14 701/23 |
| 2017/0299728 A1* | 10/2017 | Lie | ......................... | G01S 19/426 |
| 2019/0208493 A1* | 7/2019 | Xie | ........................ | G01S 19/485 |
| 2021/0170831 A1 | 6/2021 | Ruf et al. | | |
| 2021/0223406 A1* | 7/2021 | Mu | ......................... | G01S 19/115 |
| 2021/0318446 A1 | 10/2021 | Kishimoto | | |
| 2022/0408399 A1* | 12/2022 | He | ........................ | H04W 64/00 |

FOREIGN PATENT DOCUMENTS

| | | | | |
|---|---|---|---|---|
| CN | 106772511 A | * | 5/2017 | |
| JP | 2021170831 A | * | 10/2021 | |

OTHER PUBLICATIONS

M. Petovello, GNSS Solutions: Virtual Reference Stations, InsideGNSS, p. 28-31, Jul./Aug. 2011 (Year: 2011).*

(Continued)

*Primary Examiner* — Bernarr E Gregory
*Assistant Examiner* — Fred H Mull
(74) *Attorney, Agent, or Firm* — QUALCOMM Incorporated

(57) ABSTRACT

A device may use Precise Point Positioning (PPP) correction information to generate Real Time Kinematic (RTK) correction information that can be sent to other devices for RTK-based positioning. In particular, according to some embodiments, the first device having access to PPP correction information may obtain the PPP correction information and generate RTK correction information by determining a virtual RTK base station location and generating, based on the PPP correction information, a virtual Multi-Constellation Multi-Frequency (MCMF) measurement corresponding to the determined virtual RTK base station location. This virtual MCMF measurement (and/or data derived therefrom) can then be sent to other devices as RTK correction information.

32 Claims, 10 Drawing Sheets

(56) References Cited

OTHER PUBLICATIONS

W. Hu et al., Using PPP Information to Implement a Global Real-Time Virtual Network DGNSS Approach, arXiv.org e-Print archive, https://arxiv.org/abs/2110.14763v1, p. 1-14, Sep. 22, 2021 (Year: 2021).*

International Search Report and Written Opinion—PCT/US2022/077062—ISA/EPO—dated Feb. 3, 2023.

Suzuki T., et al., "Precise Point Positioning for Mobile Robots Using Software GNSS Receiver and QZSS LEX Signal", 2013 IEEE/RSJ International Conference on Intelligent Robots and Systems (ROS), IEEE, Nov. 3, 2013, pp. 369-375, XP032537227, ISSN:2153-0858, DOI:10.1109/IROS.2013.6696378, The Whole Document.

* cited by examiner

| Items | Value | Summation coefficient for Pseudorange | Summation coefficient for Carrier Phase | Computation detail |
|---|---|---|---|---|
| Geometry distance | 20225402.9904 (m) | 1 | $\frac{1}{\lambda}$ Where $\lambda$ is the wavelength, for GPS L1 is about 0.1902 m | SV position: -7482460.2029, 20947387.0936, 14406618.2167 Base position: -2144835.9456, 4397565.3789, 4078012.5692 |
| Sagnac effect correction | 2.9244 (m) | 1 | $\frac{1}{\lambda}$ | SV position adjustment due to Sagnac effect 103.0529, 36.8104, 0 LOS vector: -0.2639, 0.8182, 0.5106 Dot product of two vector: 2.9244 |
| PPP orbit correction projected to Line Of Sight (LOS) direction | -0.2450 (m) | 1 | $\frac{1}{\lambda}$ | PPP orbit correction XYZ: 1.0230, 0.4510, -0.6738 LOS vector: -0.2639, 0.8182, 0.5106 Dot product of two vector: -0.2450 |
| PPP clock correction | 0.3870 (m) | 1 | $\frac{1}{\lambda}$ | |
| Troposphere modeled value | 2.4590 (m) | 1 | $\frac{1}{\lambda}$ | |
| Ionosphere modeled value | 1.5184 (m) | 1 | $-\frac{1}{\lambda}$ | |
| Satellite phase wind-up model | 0.2808 (cycle) | 0 | 1 | |
| Solid earth tide to LOS direction | -0.0836 (m) | 1 | $\frac{1}{\lambda}$ | Solid earth tide effect on XYZ direction 0.0263, -0.0673, -0.0424 LOS vector: -0.2639, 0.8182, 0.5106 Dot product of two vector: -0.0836 |
| Measurement noise for pseudorange | 0.3 m | 1 | 0 | |
| Measurement noise for carrier phase | 0.002 m | 0 | $\frac{1}{\lambda}$ | |
| Ambiguity term (cycle) | 10 (cycle) | 0 | 1 | |
| | | | | |
| Simulated pseudorange | 20225410.2506 | | | |
| Simulated carrier phase (cycle) | 106285240.9896 | | | |

FIG. 6

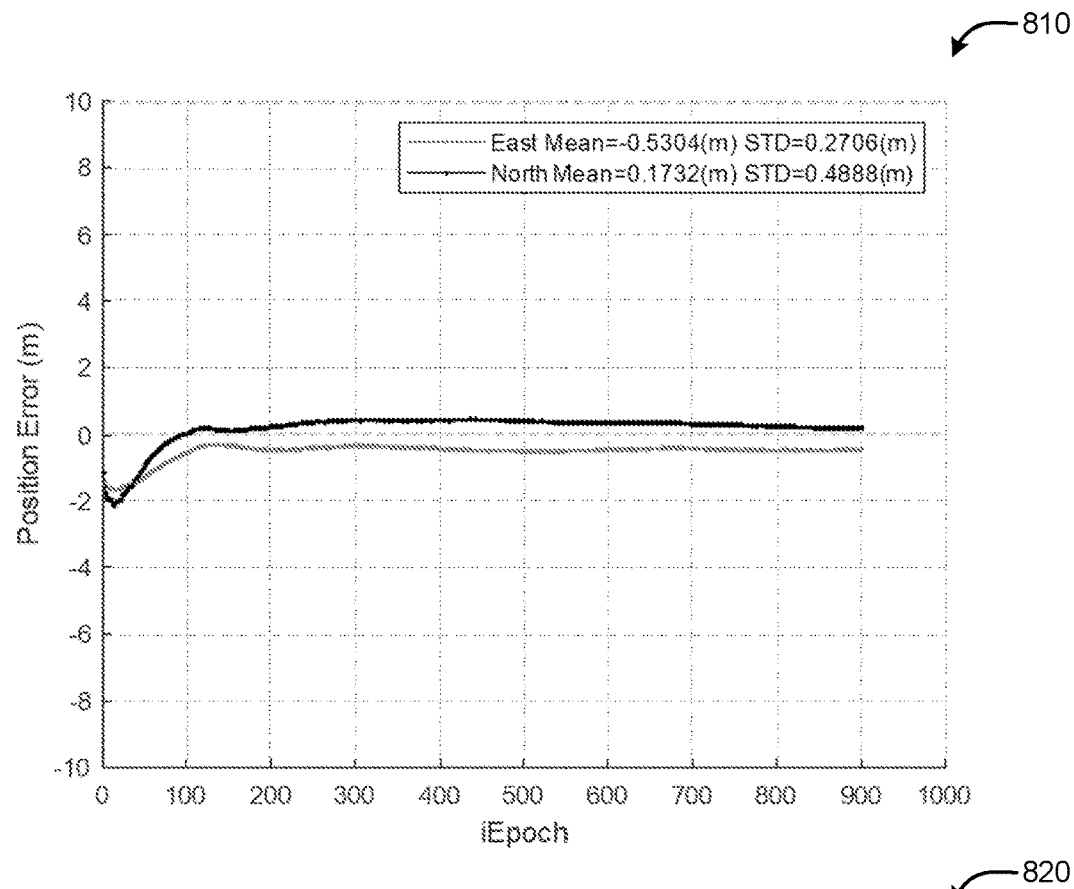
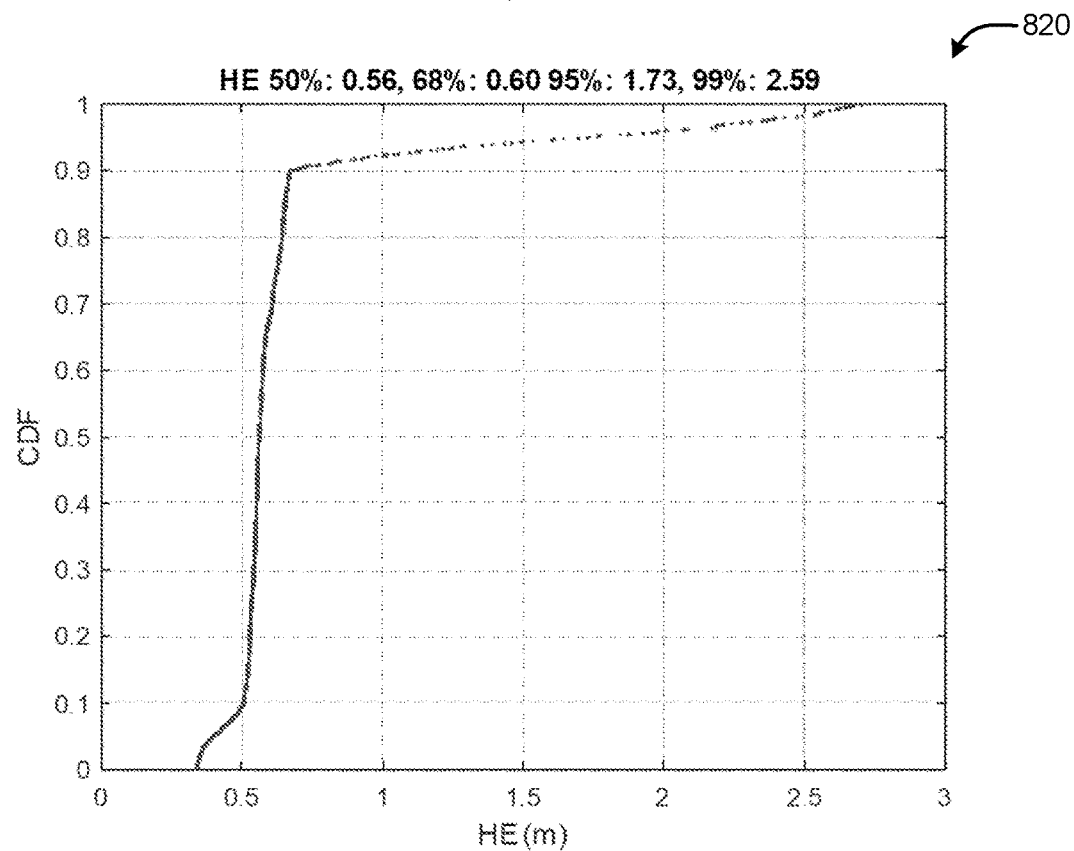
FIG. 8

PRECISE POINT POSITIONING (PPP)-BASED REAL TIME KINEMATIC (RTK) CORRECTION

BACKGROUND

1. Field of Disclosure

The present disclosure relates generally to the field of satellite-based positioning.

2. Description of Related Art

Global Navigation Satellite Systems (GNSS) positioning of mobile devices (e.g., consumer electronics, vehicles, assets, drones, etc.) can provide accurate positioning of a mobile device comprising a GNSS receiver. Traditional GNSS positioning provides an accuracy on the order of a few meters, and more precise GNSS-based techniques can provide sub-meter accuracy. Precise Point Positioning (PPP) and Real Time Kinematic (RTK) are two types of GNSS-based positioning techniques that provide more precision. Both techniques use additional correction information to achieve higher precision than traditional GNSS positioning, however this additional correction information is not always available. Further, a GNSS receiver capable of RTK positioning but not PPP positioning will be unable to achieve higher positioning precision if only PPP correction information is available.

BRIEF SUMMARY

Embodiments described herein enable a device to use PPP correction information to generate RTK correction information that can be sent to other devices for RTK-based positioning. In particular, according to some embodiments, the first device having access to PPP correction information may obtain the PPP correction information and generate RTK correction information by determining a virtual RTK base station location and generating, based on the PPP correction information, a virtual Multi-Constellation Multi-Frequency (MCMF) measurement corresponding to the determined virtual RTK base station location. This virtual MCMF measurement (and/or data derived therefrom) can then be sent to other devices as RTK correction information.

An example method of providing Real Time Kinematic (RTK) correction information for Global Navigation Satellite Systems (GNSS)-based positioning, according to this disclosure, may comprise obtaining, at a first device, Precise Point Positioning (PPP) correction information. The method also may comprise determining a virtual RTK base station location. The method also may comprise generating a virtual Multi-Constellation Multi-Frequency (MCMF) measurement corresponding to the determined virtual RTK base station location, wherein the virtual MCMF measurement is based at least in part on the PPP correction information. The method also may comprise transmitting the RTK correction information with the first device, wherein the RTK correction information is based at least in part on the virtual MCMF measurement.

An example device for providing Real Time Kinematic (RTK) correction information for Global Navigation Satellite Systems (GNSS)-based positioning, according to this disclosure, may comprise a transceiver, a memory, one or more processors communicatively coupled with the transceiver and the memory, wherein the one or more processors are configured to obtain Precise Point Positioning (PPP) correction information. The one or more processors further may be configured to determine a virtual RTK base station location. The one or more processors further may be configured to generate a virtual Multi-Constellation Multi-Frequency (MCMF) measurement corresponding to the determined virtual RTK base station location, wherein the virtual MCMF measurement is based at least in part on the PPP correction information. The one or more processors further may be configured to transmit, via the transceiver, the RTK correction information with the device, wherein the RTK correction information is based at least in part on the virtual MCMF measurement.

An example apparatus for providing Real Time Kinematic (RTK) correction information for Global Navigation Satellite Systems (GNSS)-based positioning, according to this disclosure, may comprise means for obtaining, at the apparatus, Precise Point Positioning (PPP) correction information. The apparatus further may comprise means for determining a virtual RTK base station location. The apparatus further may comprise means for generating a virtual Multi-Constellation Multi-Frequency (MCMF) measurement corresponding to the determined virtual RTK base station location, wherein the virtual MCMF measurement is based at least in part on the PPP correction information. The apparatus further may comprise means for transmitting the RTK correction information with the apparatus, wherein the RTK correction information is based at least in part on the virtual MCMF measurement.

According to this disclosure, an example non-transitory computer-readable medium stores instructions for providing Real Time Kinematic (RTK) correction information for Global Navigation Satellite Systems (GNSS)-based positioning, the instructions comprising code for obtaining, at a first device, Precise Point Positioning (PPP) correction information. The instructions further may comprise code for determining a virtual RTK base station location. The instructions further may comprise code for generating a virtual Multi-Constellation Multi-Frequency (MCMF) measurement corresponding to the determined virtual RTK base station location, wherein the virtual MCMF measurement is based at least in part on the PPP correction information. The instructions further may comprise code for transmitting the RTK correction information with the first device, wherein the RTK correction information is based at least in part on the virtual MCMF measurement.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIG. 6 is a table illustrating the generation of a virtual Multi-Constellation Multi-Frequency (MCMF) measurement, according to an example.

FIG. 8 includes graphs similar to those in FIG. 7 but showing simulation results RTK-based positioning using RTK correction information generated using the techniques provided herein from the PPP correction information used in the simulation of FIG. 7.

Figure 1:
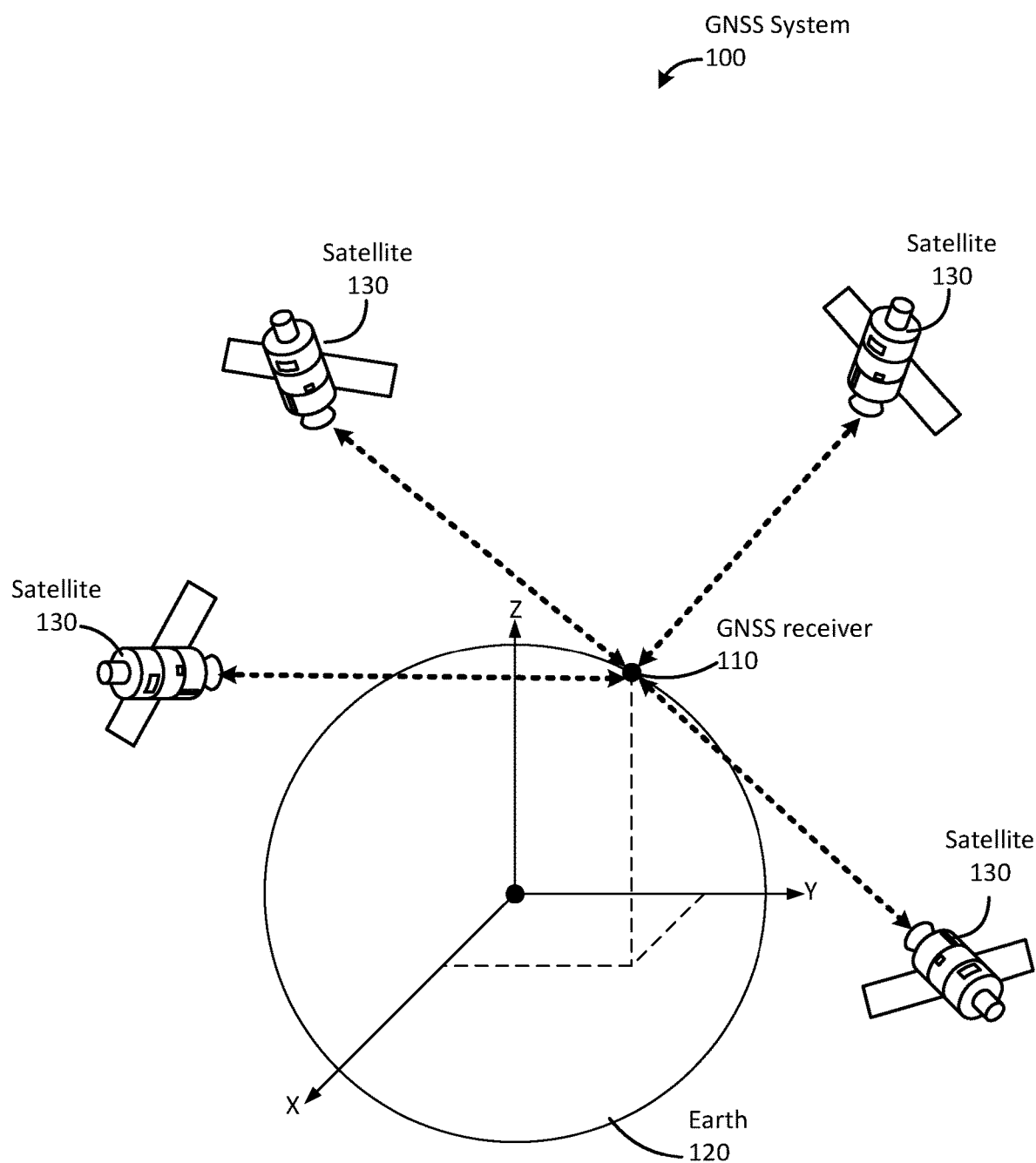
FIG. 1 is a simplified diagram of a GNSS system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used, and various modifications may be made without departing from the scope of the disclosure or the spirit of the appended claims.

As described herein, a satellite receiver, such as a Global Navigation Satellite Systems (GNSS), may be integrated into a mobile device comprising an electronic device or system. Such a mobile device can include, for example, consumer, industrial, and/or commercial electronics, vehicles, assets, vessels, and the like. As described herein, a location estimate of the satellite receiver or mobile device into which the satellite receiver is integrated may be referred to as a location, location estimate, location fix, fix, position, position estimate, or position fix of the satellite receiver or mobile device. Moreover, the location estimate may be geodetic, thus providing location coordinates for the mobile device (e.g., latitude and longitude) which may or may not include an altitude component (e.g., height above sea level, height above or depth below ground level, floor level, or basement level). In some embodiments, a location of the satellite receiver and/or mobile device comprising the satellite receiver may also be expressed as an area or volume (defined either geodetically or in civic form) within which the satellite receiver is expected to be located with some probability or confidence level (e.g., 68%, 95%, etc.). In the description contained herein, the use of the term location may comprise any of these variants unless indicated otherwise. When computing the location of a satellite receiver, such computations may solve for local X, Y, and possibly Z coordinates and then, if needed, convert the coordinates from one coordinate frame to another.

As noted, embodiments described herein enable the generation of Real Time Kinematic (RTK) correction information based on Precise Point Positioning (PPP) correction information by generating a virtual Multi-Constellation Multi-Frequency (MCMF) measurement corresponding to a virtual RTK base station location based on the PPP correction information. This RTK correction information can be sent to other devices that may be capable of processing RTK correction information but unable to process the PPP correction information. Additional details will follow after an initial description of relevant systems and technologies.

FIG. 1 is a simplified diagram of a GNSS system 100, provided to illustrate how GNSS is generally used to determine an accurate location of a GNSS receiver 110 on earth 120 (also known as "positioning" of the GNSS receiver). Put generally, the GNSS system 100 enables an accurate GNSS position fix of the GNSS receiver 110, which receives radio frequency (RF) signals from GNSS satellites 130 from one or more GNSS constellations. (A satellite such as GNSS satellites 130 may also be referred to herein as a space vehicle (SV).) The types of GNSS receiver 110 used may vary, depending on application. In some embodiments, for instance, the GNSS receiver 110 may comprise consumer electronics or devices, such as a mobile phone, tablet, laptop, wearable device, vehicle (or on-vehicle device), or the like. In some embodiments, the GNSS receiver 110 may comprise industrial or commercial equipment, such as survey equipment.

It will be understood that the diagram provided in FIG. 1 is greatly simplified. In practice, there may be dozens of satellites 130 and a given GNSS constellation, and there are many different types of GNSS systems. GNSS systems include, for example, Global Positioning System (GPS), Galileo (GAL), GLONASS, Quasi-Zenith Satellite System (QZSS) over Japan, Indian Regional Navigational Satellite System (IRNSS) over India, BeiDou Navigation Satellite System (BDS) over China, and/or the like. In addition to the basic positioning functionality later described, GNSS augmentation (e.g., a Satellite Based Augmentation System (SBAS)) may be used to provide higher accuracy. Such augmentation may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

GNSS positioning is based on multilateration, which is a method of determining position by measuring distances to points at known coordinates. In general, the determination of the position of a GNSS receiver 110 in three dimensions may rely on a determination of the distance between the GNSS receiver 110 and four or more satellites 130. As illustrated, 3D coordinates may be based on a coordinate system (e.g., XYZ, namely Cartesian coordinates; latitude, longitude, and altitude, namely Geographic coordinates; etc.) centered at the earth's center of mass. A distance between each satellite 130 and the GNSS receiver 110 may be determined using precise measurements made by the GNSS receiver 110 of a difference in time from when a radio frequency (RF) signal is transmitted from the respective satellite 130 and when it is received at the GNSS receiver 110. To help ensure accuracy, not only does the GNSS receiver 110 need to make an accurate determination of when the respective signal from each satellite 130 is received, but many additional factors need to be considered and accounted for. These factors include, for example, clock differences at the GNSS receiver 110 and satellite 130 (e.g., clock bias), a precise location of each satellite 130 at the time of transmission (e.g., as determined by the broadcast ephemeris), the impact of atmospheric distortion (e.g., ionospheric and tropospheric delays), and the like.

To perform a traditional GNSS position fix, the GNSS receiver 110 can use code-based positioning to determine its distance to each satellite 130 based on a determined delay in a generated pseudorandom binary sequence received in the RF signals received from each satellite, in consideration of the additional factors and error sources previously noted. With the distance and location information of the satellites 130, the GNSS receiver 110 can then determine a position fix for its location. This position fix may be determined, for example, by a Standalone Positioning Engine (SPE) executed by one or more processors of the GNSS receiver 110. However, code-based positioning is relatively inaccurate and, without error correction, is subject to many of the previously described errors. Even so, code-based GNSS positioning can provide an positioning accuracy for the GNSS receiver 110 on the order of meters.

More accurate carrier-based ranging is based on a carrier wave of the RF signals and may use measurements at a base or reference station (not shown) to perform error correction to help reduce errors from the previously noted error sources. More specifically, errors (e.g., atmospheric errors sources) in the carrier-based ranging of satellites 130 observed by the GNSS receiver 110 can be mitigated or canceled based on similar carrier-based ranging of the satellites 130 using a highly accurate GNSS receiver at the base station at a known location. These measurements and the base station's location can be provided to the GNSS receiver 110 for error correction. This position fix may be determined, for example, by a Precise Positioning Engine (PPE) executed by one or more processors of the GNSS receiver 110. More specifically, in addition to the information provided to an SPE, the PPE may use base station GNSS measurement information, and additional correction information, such as troposphere and ionosphere, to provide a high accuracy, carrier-based position fix. Several GNSS techniques can be adopted in PPE, such as Differential GNSS (DGNSS), Real Time Kinematic (RTK), and Precise Point Positioning (PPP), and may provide a sub-meter accuracy (e.g., on the order of centimeters).

Figure 2:
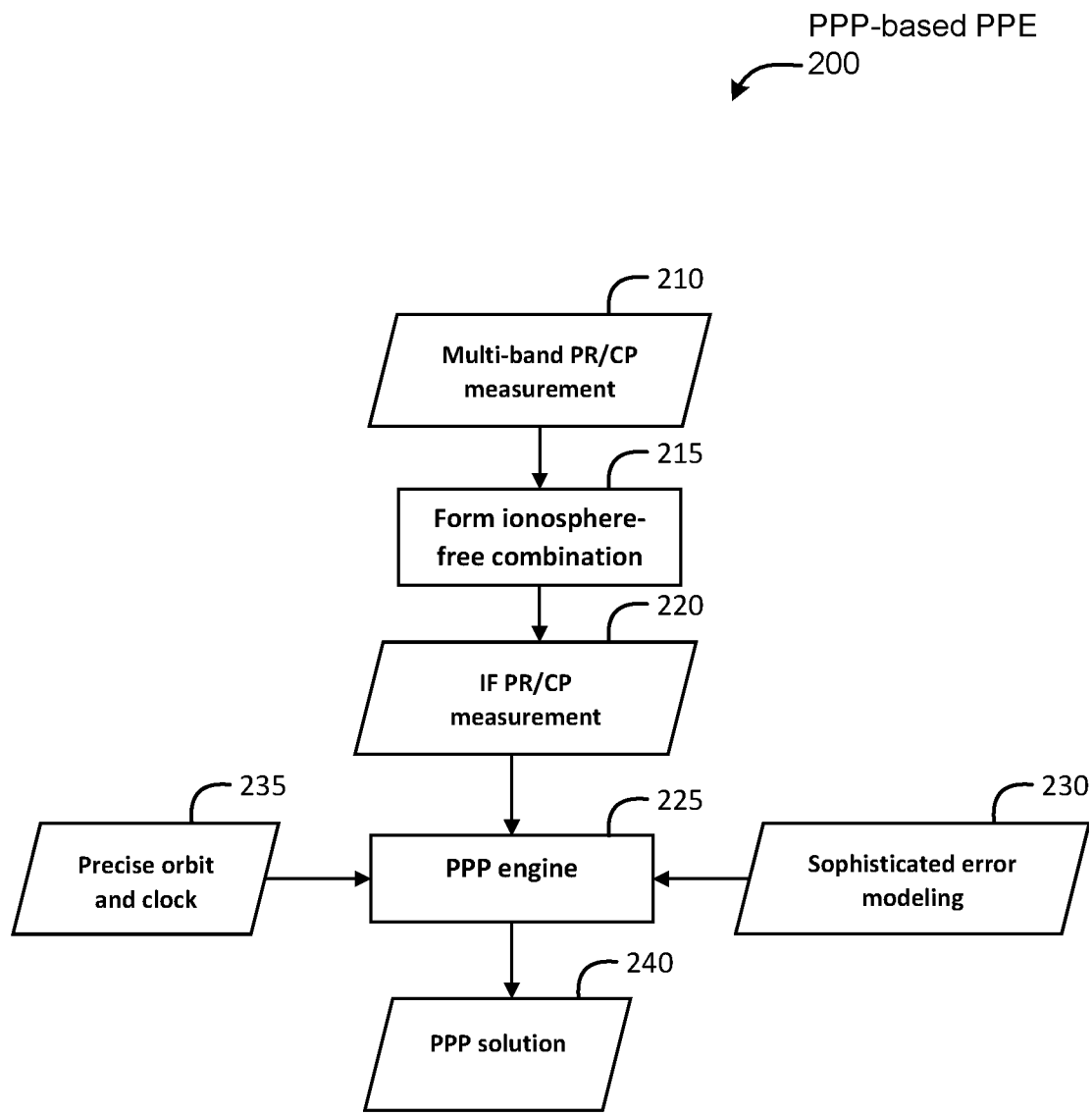
FIG. 2 is a block diagram of a Precise Point Positioning (PPP) Precise Positioning Engine (PPE), according to an embodiment.

FIG. 2 is a block diagram of a PPP-based PPE 200, which may be used to determine an accurate PPP-based position. It may also be used, at least in part, to convert PPP correction information to RTK correction information is described hereafter, according to an embodiment. The blocks in FIG. 2 comprise data and logical processes used by a PPE to perform PPP-based positioning of a GNSS receiver (e.g., the GNSS receiver 110 of FIG. 1). As noted, the PPE may be executed by one or more processors of the GNSS receiver and/or device (e.g. mobile device) into which the GNSS receiver may be integrated.

At block 210, the GNSS receiver obtains multi-band pseudo-range (PR) and carrier phase (CP) measurement of signals from each of the plurality of satellites (e.g., satellites 130 of FIG. 1). PR and CP measurements may correspond with code-based and carrier-based measurements, respectively, as previously described. To make a multi-band measurement (a measurement of signals using two or more frequencies transmitted by a satellite), embodiments may use a multi-band GNSS receiver (e.g., a dual-band receiver, tri-band receiver, etc.) capable of receiving a plurality of frequency bands. Some embodiments may use multi-constellation multi-frequency (MCMF) receivers capable of receiving multiple frequency bands on multiple constellations. Examples of different bands like me used for the multi-band PR/CP measurement at block 210 include, L1/L5 for GPS, E1/E5A for GAL, and B1C/B2A for BDS. Other embodiments may use additional or alternative bands and/or GPS constellations.

At block 215, and ionosphere-free (IF) combination is formed. An ionosphere-free combination comprises a linear combination of code and/or carrier measurements that can eliminate first order ionospheric effects from ionospheric refraction, which can increase the accuracy of the positioning solution. As shown by block 220, the ionosphere-free (IF) PR/CP measurement formed from the IF combination is provided to the PPP engine 225.

The sophisticated error modeling at block 230 comprises error modeling to mitigate inaccuracies based on various error sources. Standard PPP error mitigation includes error reduction techniques to reduce satellite different code bias (DCB), satellite phase windup-up, site displacement, and more. These errors may result in inaccuracies of several meters or more, and mitigation can be performed by a Kalman Filer (KF), which may estimate these errors/values.

The PPP engine 225 uses the IF PR/CP measurement (block 220), sophisticated error modeling (block 230), and precise orbit and clock (block 235) to conduct a KF estimation to provide the PPP solution at block 240. As a person of ordinary skill in the art will appreciate, a PPP engine can be implemented using an Extended Kalman Filter (EKF).

As noted, devices may utilize a PPE to provide high-precision positioning using PPP and/or RTK correction information. Both PPP and RTK have benefits and drawbacks. For RTK, which derives correction information from differential GNSS readings between a target device (or "rover station") and one or more local base stations, benefits include simple error modeling computation and better performance on error canceling. The drawbacks of RTK, however, include the need for local or regional reference stations and a larger bandwidth requirement (relative to PPP). For PPP, which involves providing precise orbit/clock information to a target device (and optional ionosphere and troposphere correction for additional enhancement), benefits include a low bandwidth requirement (relative to RTK) and global coverage. Drawbacks of PPP include the need for complex error modeling computation.

Because RTK is widely implemented among devices but maybe limited in coverage, situations may arise where RTK-compatible devices are unable to provide a high-precision RTK-based position due to lack of RTK correction information. This may be despite the presence of available PPP correction information, which has global coverage. Two scenarios illustrating such situations are illustrated in FIGS. 3A-3B.

Figure 3A:
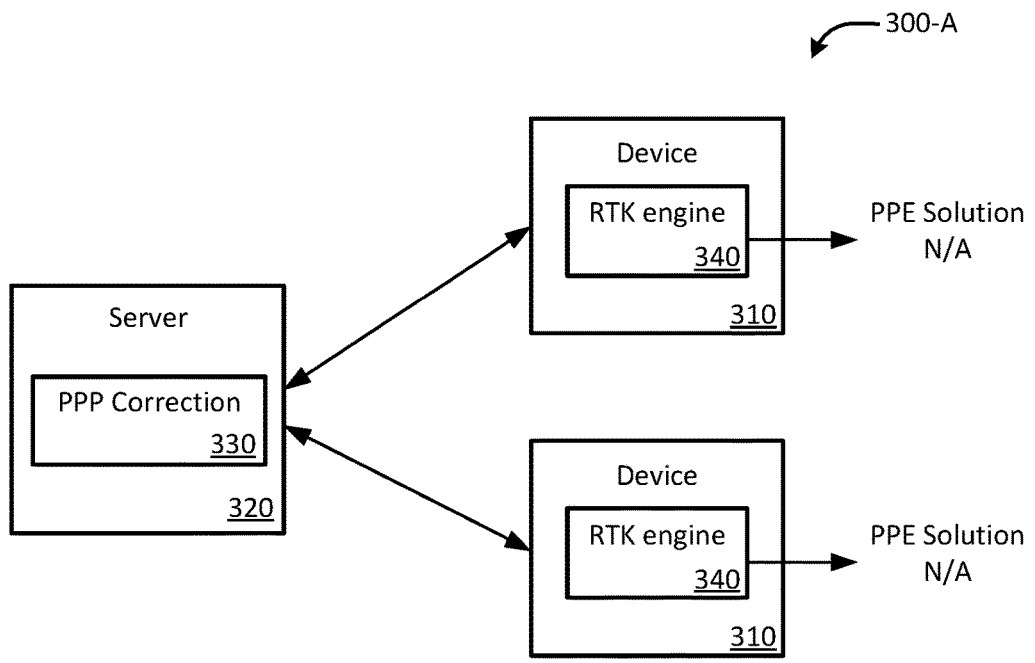
FIGS. 3A and 3B are graphs illustrating two scenarios in which PPP correction information cannot be used to enable devices to determine a PPE solution.

FIG. 3A is a diagram of a server-based scenario 300-A in which devices 310 are communicatively coupled with a server 320. In this scenario, devices 310 may comprise GNSS receivers (e.g., GNSS receiver 110), and may receive positioning-related information from the server 320 via a two-way communication link, illustrated as double-sided arrows. (Note, however, that some embodiments may involve one-way communication from the server 320.) The communication link may include wireless and/or wired communication via public and/or private networks (e.g., the Internet, cellular networks, etc.), and therefore information from the server 320 to the devices 310 may be relayed by one or more intervening devices (not shown). In some embodiments, the server 320 may be owned and/or maintained by a service provider, such as a location service provider, cellular service provider, or the like. The server 320 may comprise, for example, a positioning server that may be capable of providing RTK correction information when available, as well as assistance data for terrestrial-based positioning methods (e.g., cellular-based positioning). Further, the server 320 may also obtain PPP correction information 330 from a PPP service provider or other source. In the example of scenario 300-A, however, devices 310 have RTK engines 340 (e.g., as part of a PPE), but do not have PPP engines (e.g., PPP-based PPE 200 of FIG. 2). As such, devices 310 are unable to provide a high-precision PPE solution when the server 320 is unable to provide RTK information.

Figure 3B:
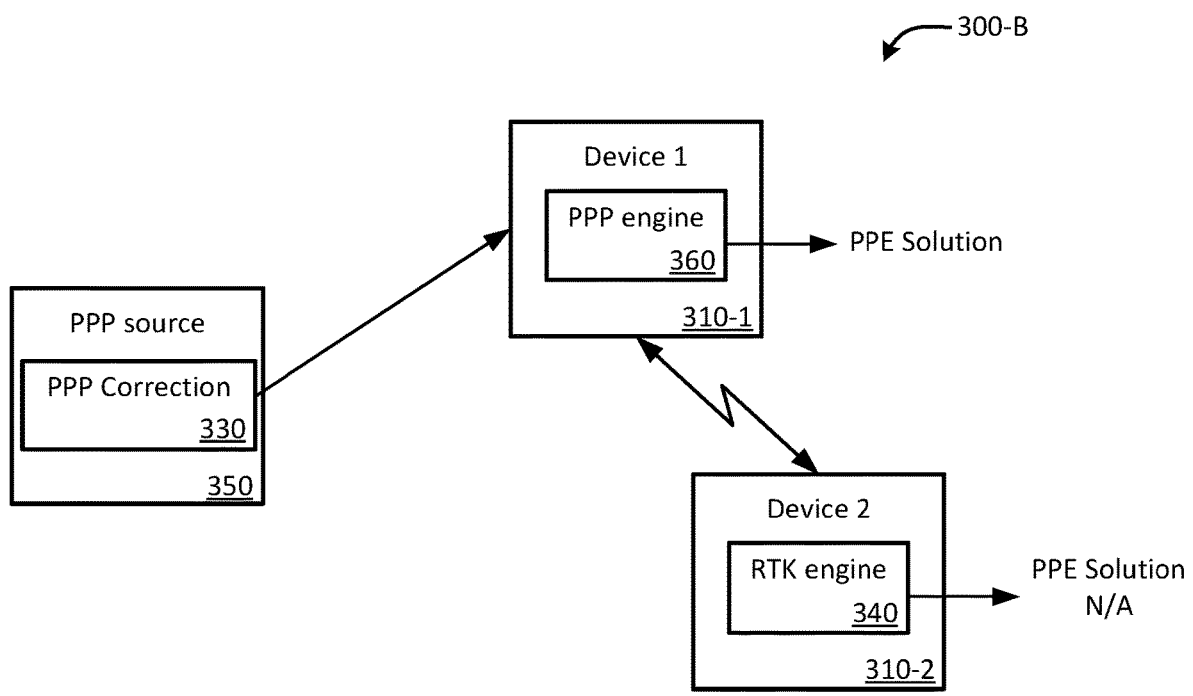

FIG. 3B is a diagram of a device-based scenario 300-B in which a first device 310-1 is communicatively coupled with a second device 310-2. In scenario 300-B, the first device 310-1 may provide location-related information to the second device 310-2, similar to the way in which the server 320 provided location-related information to devices 310 in scenario 300-B. Again, communication between the first device 310-1 and second device 310-2 may be two-way (as illustrated), or maybe one-way (from the first device 310-1 to the second device 310-2). This communication between the first device 310-1 and the second device 310-2 may be relayed by one or more intervening devices (not shown) or may be direct. A direct wireless interface between the first device 310-1 and the second device 310-2, for example, may comprise Wi-Fi, Bluetooth®, 5G sidelink, or the like. In this scenario 300-B, the first device 310-1 obtains PPP correction information 330 from a PPP source 350. Here, the PPP source 350 may be a third-party service provider (e.g., the same source from which the server 320 obtained PPP correction information 330 in scenario 300-A) or another source (e.g., PPP correction information transmitted on the GAL E6 band, BDS B2B band, QZSS L6 band, etc.). Because the first device 310-1 comprises a PPP engine 360, it is capable of demodulating and utilizing the PPP correction information 330 to provide a high precision PPE solution. However, similar to the devices 310 of scenario 300-A, the second device 310-2 in scenario 300-B has a PPE comprising an RTK engines 340 but no PPP engine. As such, the second device 310-2 is unable to provide a high precision PPE solution. Thus, in both scenarios 300-A and 300-B, the usefulness of the PPP correction information 330 is limited only to devices (e.g., the first device 310-1 of scenario 300-B) that have a PPP engine 360.

Figure 4A:
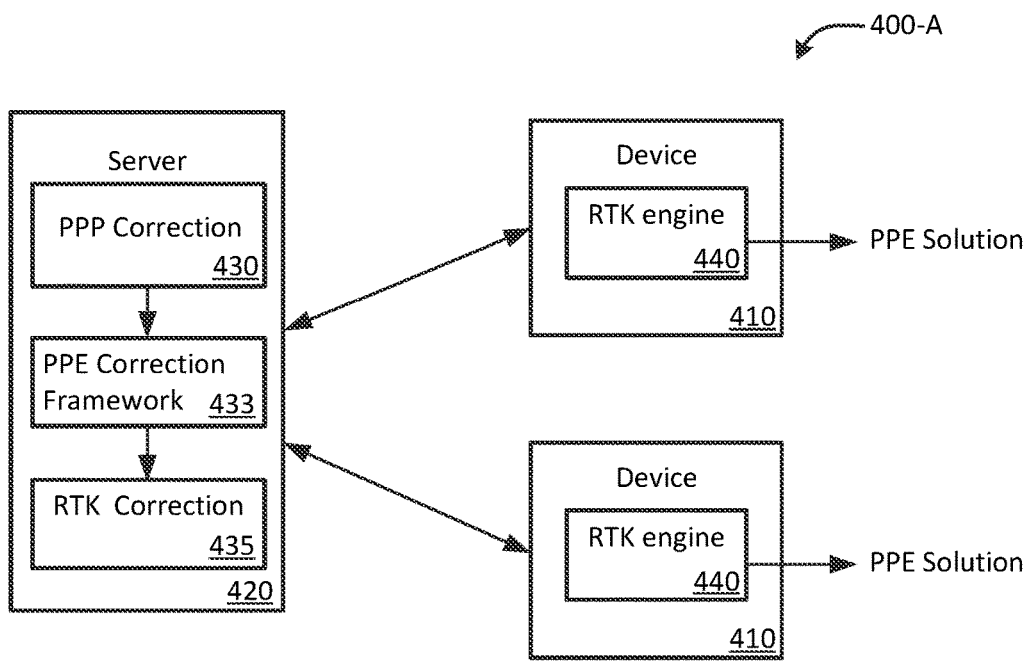
FIGS. 4A and 4B are graphs illustrating two scenarios in which PPP correction information can be used to enable devices to determine a PPE solution, according to some embodiments.
Figure 4B:
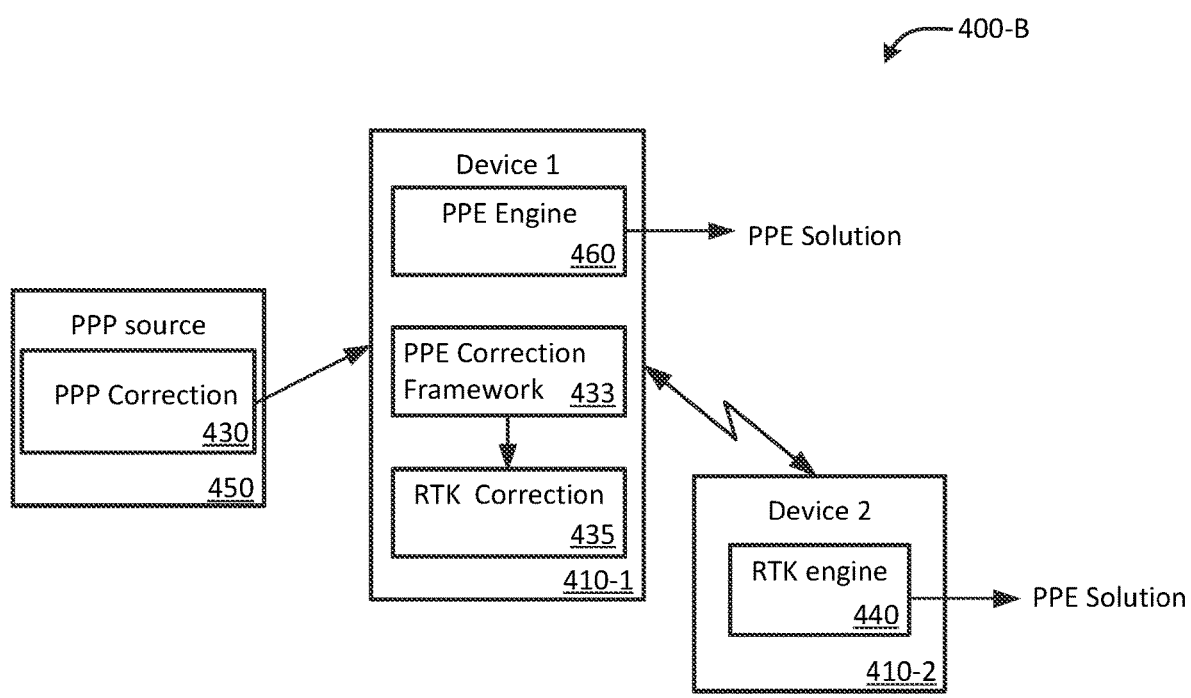

Embodiments herein address these and other issues by enabling devices to generate RTK correction information, which can be propagated as illustrated in FIGS. 4A-4B.

FIG. 4A is a diagram of a server-based scenario 400-A, similar to the scenario 300-A, in which devices 410 are communicatively coupled with a server 420. The devices 410, server 420, and communication between them may be similar to corresponding devices 310, server 320, and communication previously described with respect to scenario 300-A. Here, however, the server 420 may have additional functionality beyond the functionality of the server 320. In particular, in addition to obtaining PPP correction information 430 from a PPP service provider or other source, the server 420 includes a PPE correction framework 433 that allows the server 420 to generate RTK correction information 435, which can then be sent to devices 410 and processed by the RTK engines 440 of the devices 410, enabling the devices 410 to determine a PPE solution (e.g., a high-precision RTK-based position of the respective device 410).

FIG. 4B is a diagram of a device-based scenario 400-B, showing how the scenario 300-B can be similarly changed with the use of PPE correction framework 433 at the first device 410-1. Again, devices 410 and other components may be similar to counterparts shown in scenario 300-B and described previously, but with the first device 410-1 further comprising PPE correction framework 433 capable of generating RTK correction information 435. In the scenario 400-B, first device 410-1 obtains PPP correction information 430 from a PPP source 450, in the manner described with respect to scenario 300-B. Again, because the first device 410-1 comprises a PPP engine 460, it is capable of demodulating and utilizing the PPP correction information 430 to provide a high precision PPE solution (e.g., a high-precision PPP-based position of the first device 410-1). Further, because the first device 410-1 includes PPE correction framework 433, it can use the PPP correction 430 obtained from the PPP source 450 to generate RTK correction information 435. The RTK correction information 435, can then be sent to the second device 410-2, which can process the RTK correction information 435 with its RTK engine 440 to generate a PPE solution (e.g., a high-precision RTK-based position of the second device 410-2).

Enabling a device (e.g., server 420 or first device 410-1) to generate and propagate RTK correction information based on PPP correction information in the manner illustrated in FIGS. 4A and 4B and detailed in the embodiments herein provides various benefits. First, unlike traditional RTK services, no base stations are needed. Instead, correction information can be generated for virtual RTK base stations, which can be generated to provide broad coverage over a geographical region. Further, no changes need to be made to receiving devices with RTK engines (e.g., RTK engine 440) to be able to process the RTK correction information. And because RTK engines are widespread, embodiments described herein can ultimately enable a large number of devices to provide high-precision RTK-based positioning determinations by providing RTK correction information where there otherwise would be none.

Figure 9:
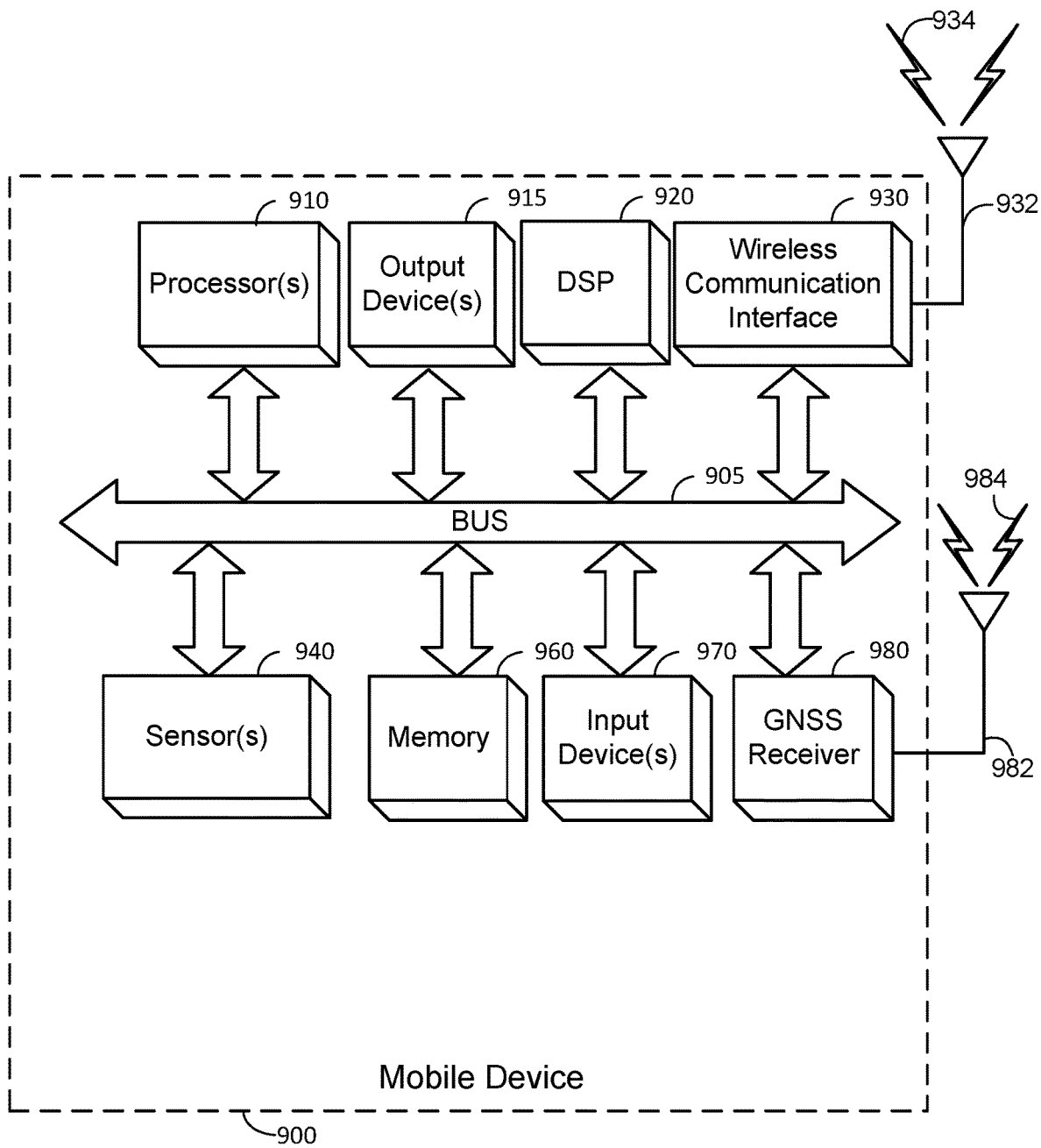
FIG. 9 is a block diagram of various hardware and software components of a mobile device, according to an embodiment.
Figure 10:
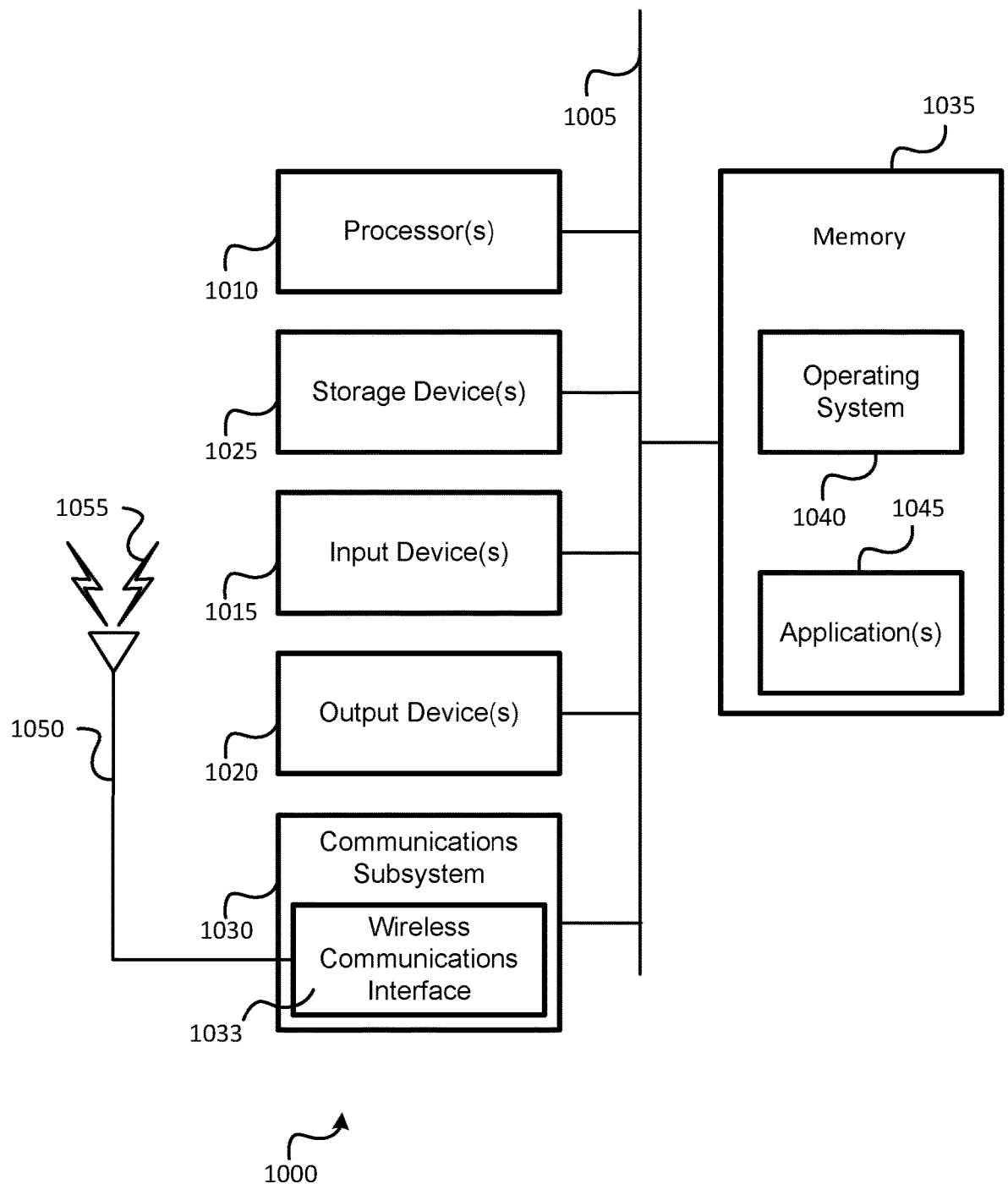
FIG. 10 is a block diagram of various hardware and software components of a computer server, according to an embodiment.

The precise implementation of the PPE correction framework may vary, depending on desired functionality. In general, the PPE correction framework may comprise hardware and/or software components (e.g., as illustrated in FIGS. 9 and 10) capable of generating RTK correction information based on PPP correction information and generating RTK correction information. An example of this process, according to some embodiments, as illustrated in FIG. 5.

Figure 5:
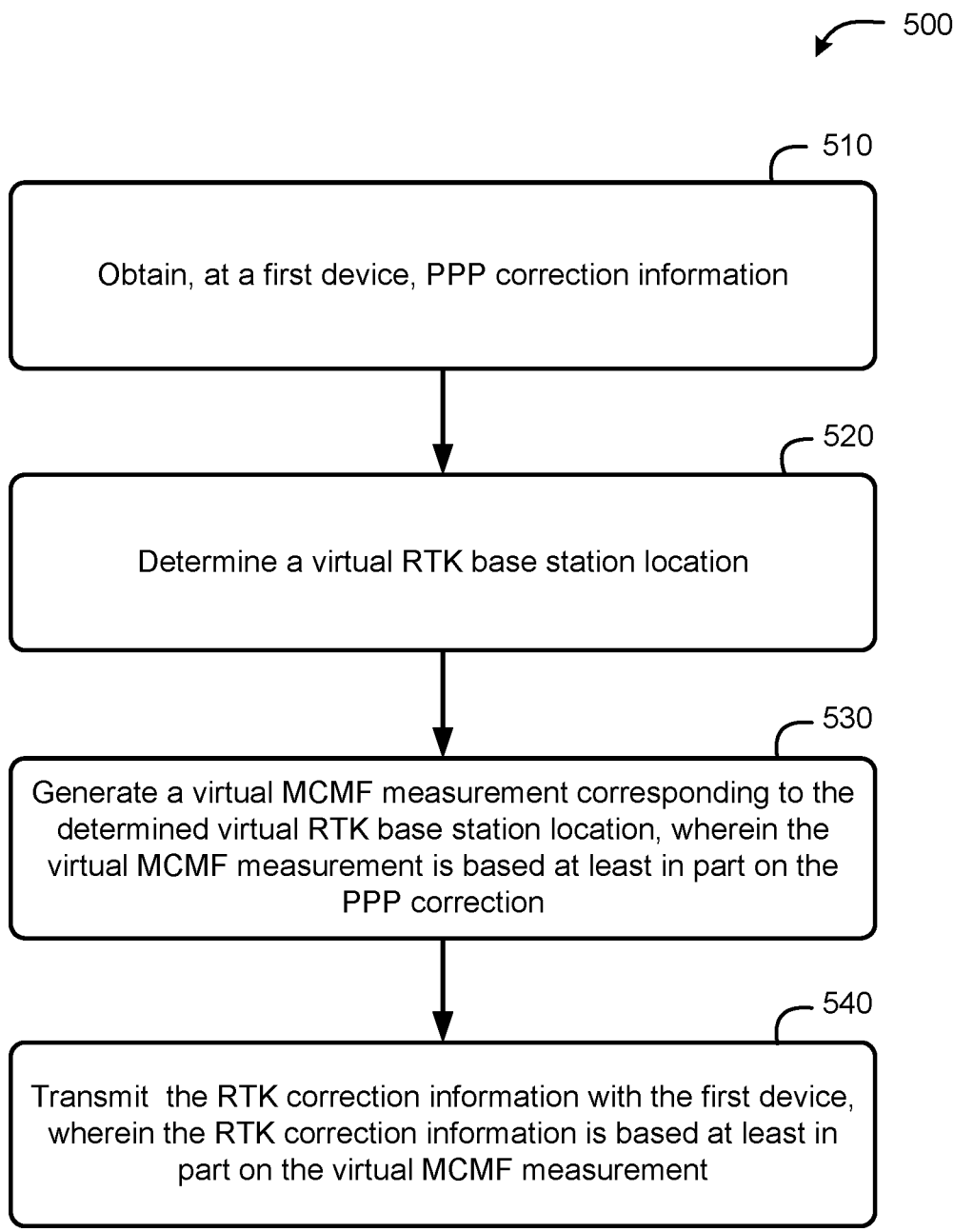
FIG. 5 is a flow diagram of a method of providing Real Time Kinematic (RTK) correction information for Global Navigation Satellite Systems (GNSS)-based positioning, according to an embodiment.

FIG. 5 is a flow diagram of a method 500 of providing RTK correction information for GNSS-based positioning, according to an embodiment. In this method 500, RTK correction information is generated based at least in part on PPP correction information, as described above. Means for performing the functionality illustrated in one or more of the blocks shown in FIG. 5 may be performed by hardware and/or software components of a server (e.g., server 420) or another electronic device (e.g., first device 410-1), including a mobile device. Example components of a mobile device are illustrated in FIG. 9, and example components of a server are illustrated in FIG. 10, both of which are described in more detail hereafter.

At block 510, the functionality comprises obtaining, at a first device, PPP correction information. As noted in the embodiments previously described, PPP correction information may be obtained from a third party service, which may transmit the PPP correction information via wired and/or wireless means using public and/or private networks (e.g., the Internet). Because satellites may transmit PPP correction information (e.g., such as GAL E6 band, BDS B2B band, QZSS L6 band, etc., as noted) PPP correction information may be directly obtained from a satellite if the first device comprises a GNSS receiver. Means for performing functionality at block 510 may comprise a bus 905, processor(s) 910, digital signal processor (DSP) 920, memory 960, 300GNSS receiver 980, and/or other components of a mobile device 900 as illustrated in FIG. 9; or bus 1005, processor(s) 1010, communications subsystem 1030, wireless communication interface 1033, memory 1035, operating system 1040, application(s) 1045, and/or other components of a computer system 1000, as illustrated in FIG. 10.

At block 520, the functionality comprises determining a virtual RTK base station location. Traditional RTK correction involves the use of base stations at known locations with highly-accurate GNSS receivers that measure GNSS signals. The method 500 emulates this by generating virtual GNSS (MCMF) measurements, which begins by determining a location from which a "virtual" RTK base station may be located.

The location of virtual RTK base stations can vary, depending on desired functionality. According to some embodiments, the first device may generate RTK correction information for receiving devices within a large geographical region (e.g., a state, country, continent, or the entire earth). The geographical region may then be divided into smaller subregions where a virtual RTK base station is located within each subregion. In such embodiments, the first device can generate and send RTK correction information of a virtual RTK base station to any/all GNSS devices located within the respective subregion of the virtual RTK base station for RTK-based positioning. Positions for the virtual RTK base stations may be predetermined, based on the geometry of the geographic region. The geographic region may, for example, be divided into subregions based on a grid pattern, where each cell in the grid comprises a rectangle or square, which may be based on latitude and longitude (e.g., cell sizes may be 5°×5°, 5°×10°, 10°×10°, etc.). Thus, in some embodiments of the method 500, determining the virtual RTK base station location comprises obtaining the virtual RTK base station location from a plurality of predetermined virtual RTK base station locations. Moreover, in some embodiments, the plurality of predetermined virtual RTK base station locations are geographically distributed in grid pattern.

In some embodiments, the location of the virtual RTK base station may be based on a location of a second device. That is, the first device can RTK correction information on demand based on a location of the second device. In such instances, the second device (or another device) may provide to the first device with an approximate location of the second device (e.g., based on traditional GNSS positioning, a terrestrial-based positioning, etc.). Using this approximate location, the first device can then determine a location of the virtual RTK base station and generate RTK correction information for the second device. Such embodiments may determine the virtual RTK base station location by, for example, rounding the approximate location of the second device to the nearest latitude and/or longitude degree. This may make the virtual RTK base station location several kilometers or tens of kilometers away from the second device, which can help set the accuracy expectation of the second device to an appropriate level (whereas setting the virtual RTK base station location only meters away may, in some instances, because the receiving device to have a higher accuracy expectation than can be provided).

Means for performing functionality at block 520 may comprise a bus 905, processor(s) 910, DSP 920, memory 960, and/or other components of a mobile device 900 as illustrated in FIG. 9; or bus 1005, processor(s) 1010, communications subsystem 1030, wireless communication interface 1033, memory 1035, operating system 1040, application(s) 1045, and/or other components of a computer system 1000, as illustrated in FIG. 10.

At block 530, the functionality comprises generating a virtual MCMF measurement corresponding to the determined virtual RTK base station location, wherein the virtual MCMF measurement is based at least in part on the PPP correction. That is, using the PPP correction, the first device can generate information to simulate what an actual RTK base station would measure at the virtual RTK base station location. MCMF measurement generation can be done using not only PPP orbit/clock correction and (optionally) PPP troposphere and ionosphere correction, but also information including broadcast ephemeris orbit/clock (which can be corrected by the PPP orbit/clock correction), Sagnac effect correction, troposphere and/or ionosphere models, a satellite phase wind-up model, a site displacement model (solid earth tide, ocean loading), and (optionally) measurement noise. An example of MCMF out measurement generation is described in more detail hereafter with regard to FIG. 6.

Means for performing functionality at block 530 may comprise a bus 905, processor(s) 910, DSP 920, memory 960, GNSS receiver 980, and/or other components of a mobile device 900 as illustrated in FIG. 9; or bus 1005, processor(s) 1010, communications subsystem 1030, wireless communication interface 1033, memory 1035, operating system 1040, application(s) 1045, and/or other components of a computer system 1000, as illustrated in FIG. 10.

At block 540, the method 500 comprises transmitting the RTK correction information with the first device, wherein the RTK correction information is based at least in part on the virtual MCMF measurement. The format used in the transmission may be based on a format for transmitting the RTK correction information, which may be based on capabilities of a receiving device. For example, Radio Technical Commission for Maritime Services (RTCM) standards include RTCM 3, which is often used in wireless communications and may comprise the virtual MCMF measurement itself. RTCM 2, on the other hand, is a different format that can be generated based on the virtual MCMF measurement.

As previously described, the transmission of RTK correction information may vary. In some embodiments of the method 500, transmitting the RTK correction information may comprise broadcasting the RTK correction information. In some embodiments of the method 500, transmitting the RTK correction information may comprise sending the RTK correction information to a second device. In some instances, the second device may comprise a mobile GNSS device that uses the RTK correction information to determine its location. In such embodiments, where two-way communication exists between the first and second devices, the method 500 may further comprise receiving an indication of a location of the second device. In such instances, as previously noted, determining the virtual RTK base station location may be based at least in part on the location of the second device. As illustrated in FIG. 4B, the first device may comprise a mobile device, in which case the second device may also comprise a mobile device. As illustrated in FIG. 4A, the first device may comprise a server, in which case the second device may comprise any of a variety of device types. For example, the second device may comprise a GNSS receiver, in which case the second device determines its location from the RTK correction received from the server. Alternatively, the second device may comprise a device from which RTK correction information may be propagated. For example, in embodiments in which RTK correction information is provided for virtual RTK base stations of a geographical region divided into subregions forming in a grid pattern, RTK correction information corresponding to the virtual RTK base station located within a cell of the grid may be sent to a device located within the cell and transmitted (e.g. broadcast) by the device to other devices within the cell. This can be repeated for each cell in the grid. Physical devices that transmit or broadcast RTK correction information may include, for example, mobile devices, cellular base stations, radio towers, Internet of things (JOT) devices, roadside units (RSUs) in a vehicle-to-everything (V2X) regime, or the like.

Means for performing functionality at block 540 may comprise a bus 905, processor(s) 910, DSP 920, memory 960, and/or other components of a mobile device 900 as illustrated in FIG. 9; or bus 1005, processor(s) 1010, communications subsystem 1030, wireless communication interface 1033, memory 1035, operating system 1040, application(s) 1045, and/or other components of a computer system 1000, as illustrated in FIG. 10.

FIG. 6 is a table illustrating the generation of a virtual MCMF measurement, according to an example. In this example, the approximate location of a receiving device in Cartesian coordinates (XYZ in meters) is: −2175327.6252, 4384343.1054, 4076110.5626. This translates to a geographic coordinates latitude (in degrees), longitude (in degrees), and height (in meters) of: 39.9776432048829, 116.388683909549, and 41.8848. Using this approximate location of the receiving device, a location for a virtual RTK base station is determined by rounding to 40.00 degrees latitude, 116.00 degrees longitude, and 42.00 meters in height, making the virtual RTK base station location about 33 km away from the receiving device. With this virtual RTK base station location determined, and using (among other things) PPP correction information, the values shown in FIG. 6 can be determined, including simulated pseudorange and carrier phase of the virtual MCMF measurement. Details regarding the computation of certain values are provided in FIG. 6. As noted, this measurement can then be provided (e.g., under RTCM 3) or reformatted (e.g. under RTCM 2) as RTK correction information to the receiving device.

Simulated results of RTK-based positioning using RTK correction information generated using the techniques provided herein can provide similar accuracy to PPP-based positioning using the PPP correction information from which the RTK correction information is generated. A comparison of PPP-based and RTK-based positioning used in the simulations are shown in FIGS. 7 and 8.

Figure 7:
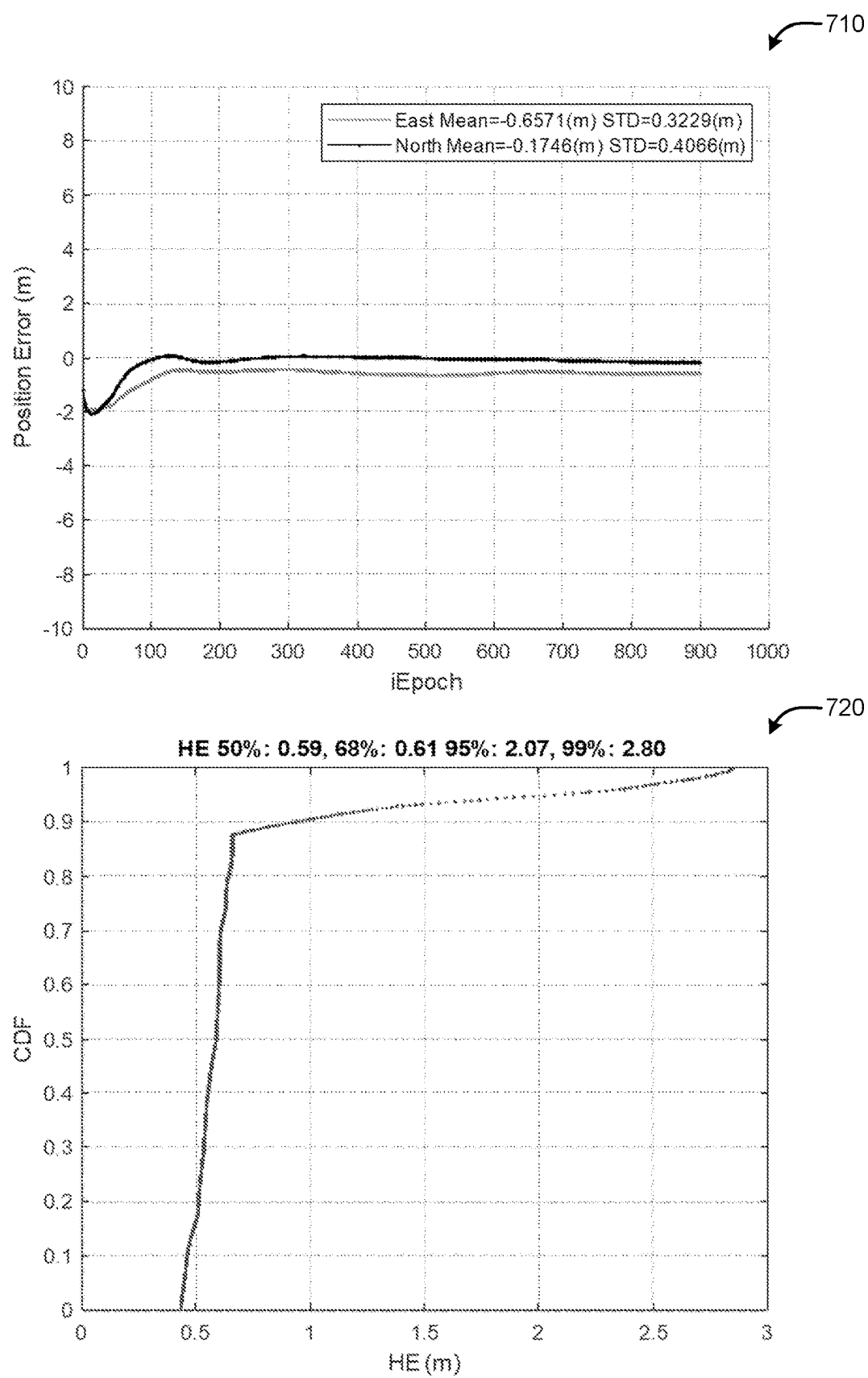
FIG. 7 includes two graphs that show simulated PPP-based positioning results of a device using PPP correction information.

FIG. 7 includes graphs that show simulated PPP-based positioning results of a device using PPP correction information. A first graph 710 plots position error for the test for East and North in an East, North, Up (ENU) coordinate frame over time (approximately 900 epochs, where each epoch is one second). A second graph 720 shows a corresponding Cumulative Distribution Function (CDF) of horizontal error (HE) for the simulation. As can be seen from the first graph 710, position error starts at around 2 m and remains less than 1 m after approximately 100 epochs. Further, as shown by the second graph 720, 50% of the HE error values are less than 0.59 m, and 95% are less than 2.07 m.

FIG. 8 includes graphs similar to those in FIG. 7 but showing simulation results RTK-based positioning using RTK correction information generated using the techniques provided herein from the PPP correction information used in the simulation of FIG. 7. A first graph 810 plots position error for the test for East and North in an East, North, Up (ENU) coordinate frame over time. A second graph 820 shows a corresponding CDF of HE for the test. In that the first graph a 10, position error largely mirrors the positioning error of graph 710 of FIG. 7, starting at around 2 m and falling to under 1 m after approximately 100 epochs. Further, as shown by the second graph 820, 50% of the HE error values are less than 0.58 m and 95% are less 1.73 m, which are values similar to those in the simulation of FIG. 7. Thus, generating RTK correction information using PPP correction information in the manner described herein can provide positioning results that have a similar accuracy to those that use the underlying PPP correction information.

FIG. 9 is a block diagram of various hardware and software components of a mobile device 900, according to an embodiment. These components can be utilized as described herein above (e.g. in association with FIGS. 1-8). For example, the mobile device 900 can perform the operations of the method illustrated in FIG. 5, and/or one or more of the functions of a GNSS receiver as described in the embodiments herein. It should be noted that FIG. 9 is meant only to provide a generalized illustration of various components, any or all of which may be utilized as appropriate. As previously noted, mobile device 900 may vary in form and function, and may ultimately comprise any GNSS-enabled device, including vehicles, commercial and consumer electronic devices, survey equipment, and more. Thus, in some instances, components illustrated by FIG. 9 can be localized to a single physical device and/or distributed among various networked devices, which may be disposed at different physical locations (e.g., different locations of a vehicle). It can be further noted that reference stations may utilize hardware and/or software components similar to the mobile device 900.

The mobile device 900 is shown comprising hardware elements that can be electrically coupled via a bus 905 (or may otherwise be in communication, as appropriate). The hardware elements may include a processor(s) 910 which can include without limitation one or more general-purpose processors, one or more special-purpose processors (such as DSP chips, graphics processors (GPUs), application specific integrated circuits (ASICs), and/or the like), and/or other processor, processing structure, processing unit, or processing means. As shown in FIG. 9, some embodiments may have a separate DSP 920, depending on desired functionality. Location determination and/or other determinations based on wireless communication may be provided in the processor(s) 910 and/or wireless communication interface 930 (discussed below). The mobile device 900 also can include one or more input devices 970, which can include without limitation a keyboard, touch screen, a touch pad, microphone, button(s), dial(s), switch(es), and/or the like; and one or more output devices 915, which can include without limitation a display, light emitting diode (LED), speakers, and/or the like. As will be appreciated, the type of input devices 970 and output devices 915 may depend on the type of mobile device 900 with which the input devices 970 and output devices 915 are integrated.

The mobile device 900 may also include a wireless communication interface 930, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX™ device, a Wide Area Network (WAN) device and/or various cellular devices, etc.), and/or the like, which may enable the mobile device 900 to communicate via networks and/or directly with other devices as described herein. The wireless communication interface 930 may permit data and signaling to be communicated (e.g. transmitted and received) with a network, for example, via WAN access points, cellular base stations and/or other access node types, and/or other network components, computer systems, and/or any other electronic devices described herein. The communication can be carried out via one or more wireless communication antenna(s) 932 that send and/or receive wireless signals 934. The antenna(s) 932 may comprise one or more discrete antennas, one or more antenna arrays, or any combination.

Depending on desired functionality, the wireless communication interface 930 may comprise separate transceivers, a separate receiver and transmitter, or any combination of transceivers, transmitters, and/or receivers to communicate with base stations and other terrestrial transceivers, such as wireless devices and access points. The mobile device 900 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX™ (IEEE 802.16) network, and so on. A CDMA network may implement one or more radio access technologies (RATs) such as CDMA2000®, Wideband CDMA (WCDMA), and so on. CDMA2000® includes IS-95, IS-2000, and/or IS-856 standards. A TDMA network may implement Global System for Mobile Communications (GSM), Digital Advanced Mobile Phone System (D-AMPS), or some other RAT. An OFDMA network may employ Long-Term Evolution (LTE), LTE Advanced, 5G NR, 6G, and so on. 5G NR, LTE, LTE Advanced, GSM, and WCDMA are described in documents from the Third Generation Partnership Project (3GPP™). CDMA2000® is described in documents from a consortium named "3rd Generation Partnership Project 2" (3GPP2). 3GPP™ and 3GPP2 documents are publicly available. A wireless local area network (WLAN) may also be an IEEE 802.11x network, and a wireless personal area network (WPAN) may be a Bluetooth® network, an IEEE 802.15x, or some other type of network. The techniques described herein may also be used for any combination of WWAN, WLAN and/or WPAN.

The mobile device 900 can further include sensor(s) 940. Sensors 940 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to complement and/or facilitate the location determination described herein, in some instances.

Embodiments of the mobile device 900 may also include a GNSS receiver 980 capable of receiving signals 984 from one or more GNSS satellites (e.g., satellites 130) as described herein using an antenna 982 (which could be the same as antenna 932). The GNSS receiver 980 can extract a position of the mobile device 900, using conventional techniques, from GNSS SVs of a GNSS system (e.g., SVs 140 of FIG. 3), such as GPS, GAL, Global Navigation Satellite System (GLONASS), Quasi-Zenith Satellite System (QZSS) over Japan, Indian Regional Navigational Satellite System (IRNSS) over India, Beidou Navigation Satellite System (BDS) over China, and/or the like. Moreover, the GNSS receiver 980 can be used with various augmentation systems (e.g., Satellite-based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 980 illustrated in FIG. 9 is illustrated as a component distinct from other components within a mobile device 900, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 910, DSP 920, and/or a processor within the wireless communication interface 930 (e.g., in a modem). A GNSS receiver may optionally also include a positioning engine, such as those described herein (e.g., a PPE and/or SPE, which may be implemented using one or more of a KF, Weighted Least Squares (WLS), hatch filter, particle filter, etc.), which can use a PPP engine (e.g., as described with regard to FIG. 2) to determine a PPE solution and/or generate RTK correction information using PPP correction information as described herein. The positioning engine may also be executed by one or more processors, such as processor(s) 910 and/or DSP 920.

The mobile device 900 may further include and/or be in communication with a memory 960. The memory 960 may comprise a machine- or computer-readable medium, which can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 960 of the mobile device 900 also can comprise software elements (not shown in FIG. 9), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 960 that are executable by the mobile device 900 (and/or processor(s) 910 or DSP 920 within mobile device 900). In an aspect, then, such code and/or instructions can be used to configure and/or adapt a general-purpose computer (or other device) to perform one or more operations in accordance with the described methods.

FIG. 10 is a block diagram of an embodiment of a computer system 1000, which may be used, in whole or in part, to provide the functions of a computer and/or server described in the embodiments herein (e.g., server 420 of FIG. 4A). It should be noted that FIG. 10 is meant only to provide a generalized illustration of various components, any or all of which may be utilized as appropriate. Further, computer system 100 may be capable of performing some or all of the functions of method 500 of FIG. 5. FIG. 10 broadly illustrates how individual system elements may be implemented in a relatively separated or relatively more integrated manner. In addition, it can be noted that components illustrated by FIG. 10 can be localized to a single device and/or distributed among various networked devices, which may be disposed at different geographical locations.

The computer system 1000 is shown comprising hardware elements that can be electrically coupled via a bus 1005 (or may otherwise be in communication, as appropriate). The hardware elements may include processor(s) 1010, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1000 also may comprise one or more input devices 1015, which may comprise without limitation a mouse, a keyboard, a camera, a microphone, and/or the like; and one or more output devices 1020, which may comprise without limitation a display device, a printer, and/or the like.

The computer system 1000 may further include (and/or be in communication with) one or more non-transitory storage devices 1025, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1000 may also include a communications subsystem 1030, which may comprise wireless communication technologies managed and controlled by a wireless communication interface 1033, as well as wired technologies (such as Ethernet, coaxial communications, universal serial bus (USB), and the like). The wireless communication interface 1033 may comprise one or more wireless transceivers may send and receive wireless signals 1055 (e.g., signals according to 5G NR or LTE) via wireless antenna(s) 1050. Thus the communications subsystem 1030 may comprise a modem, a network card (wireless or wired), an infrared communication device, a wireless communication device, and/or a chipset, and/or the like, which may enable the computer system 1000 to communicate on any or all of the communication networks described herein to any device on the respective network and/or any other electronic devices described herein. Hence, the communications subsystem 1030 may be used to receive and send data as described in the embodiments herein. In some embodiments, the computer system 1000 may comprise a GNSS receiver, which may be a discrete component (not shown) and/or may be integrated into another component of the computer system 1000.

In many embodiments, the computer system 1000 will further comprise a working memory 1035, which may comprise a RAM or ROM device, as described above. Software elements, shown as being located within the working memory 1035, may comprise an operating system 1040, device drivers, executable libraries, and/or other code, such as one or more applications 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description, embodiments may include different combinations of features. Implementation examples are described in the following numbered clauses:

Clause 1. A method of providing Real Time Kinematic (RTK) correction information for Global Navigation Satellite Systems (GNSS)-based positioning, the method comprising: obtaining, at a first device, Precise Point Positioning (PPP) correction information; determining a virtual RTK base station location; generating a virtual Multi-Constellation Multi-Frequency (MCMF) measurement corresponding to the determined virtual RTK base station location, wherein the virtual MCMF measurement is based at least in part on the PPP correction information; and transmitting the RTK correction information with the first device, wherein the RTK correction information is based at least in part on the virtual MCMF measurement.

Clause 2. The method of clause 1, wherein transmitting the RTK correction information comprises sending the RTK correction information to a second device.

Clause 3. The method of any of clauses 1-2 further comprising receiving an indication of a location of the second device, wherein determining the virtual RTK base station location is based at least in part on the location of the second device.

Clause 4. The method of any of clauses 1-3 wherein the first device comprises a server and the second device comprises a mobile device or cellular base station.

Clause 5. The method of any of clauses 1-3 wherein the first device comprises a first mobile device and the second device comprises a second mobile device.

Clause 6. The method of any of clauses 1-2 wherein determining the virtual RTK base station location comprises obtaining the virtual RTK base station location from a plurality of predetermined virtual RTK base station locations.

Clause 7. The method of clause 6 wherein the plurality of predetermined virtual RTK base station locations are geographically distributed in grid pattern.

Clause 8. The method of any of clauses 1-7 wherein transmitting the RTK correction information comprises broadcasting the RTK correction information.

Clause 9. A device for providing Real Time Kinematic (RTK) correction information for Global Navigation Satellite Systems (GNSS)-based positioning, the device comprising: a transceiver; a memory; and one or more processors communicatively coupled with the transceiver and the memory, wherein the one or more processors are configured to: obtain Precise Point Positioning (PPP) correction information; determine a virtual RTK base station location; generate a virtual Multi-Constellation Multi-Frequency (MCMF) measurement corresponding to the determined virtual RTK base station location, wherein the virtual MCMF measurement is based at least in part on the PPP correction information; and transmit, via the transceiver, the RTK correction information with the device, wherein the RTK correction information is based at least in part on the virtual MCMF measurement.

Clause 10. The device of clause 9, wherein, to transmit the RTK correction information, the one or more processors are configured to send the RTK correction information to a second device.

Clause 11. The device of any of clauses 9-10 wherein the one or more processors are further configured to receive an indication of a location of the second device, wherein the one or more processors are further configured to determine the virtual RTK base station location based at least in part on the location of the second device.

Clause 12. The device of any of clauses 9-11 wherein the device comprises a server and the second device comprises a mobile device or cellular base station.

Clause 13. The device of any of clauses 9-11 wherein the device comprises a first mobile device and the second device comprises a second mobile device.

Clause 14. The device of any of clauses 9-13 wherein, to determine the virtual RTK base station location, the one or more processors are configured to obtain the virtual RTK base station location from a plurality of predetermined virtual RTK base station locations.

Clause 15. The device of clause 14 wherein the plurality of predetermined virtual RTK base station locations are geographically distributed in grid pattern.

Clause 16. The device of any of clauses 9-15 wherein, to transmit the RTK correction information, the one or more processors are configured to broadcast the RTK correction information.

Clause 17. An apparatus for providing Real Time Kinematic (RTK) correction information for Global Navigation Satellite Systems (GNSS)-based positioning, the apparatus comprising: means for obtaining, at the apparatus, Precise Point Positioning (PPP) correction information; means for determining a virtual RTK base station location; means for generating a virtual Multi-Constellation Multi-Frequency (MCMF) measurement corresponding to the determined virtual RTK base station location, wherein the virtual MCMF measurement is based at least in part on the PPP correction information; and means for transmitting the RTK correction information with the apparatus, wherein the RTK correction information is based at least in part on the virtual MCMF measurement.

Clause 18. The apparatus of clause 17, wherein the means for transmitting the RTK correction information comprises means for sending the RTK correction information to a device separate from the apparatus.

Clause 19. The apparatus of any of clauses 17-18 further comprising means for receiving an indication of a location of the device separate from the apparatus, wherein determining the virtual RTK base station location is based at least in part on the location of the device separate from the apparatus.

Clause 20. The apparatus of any of clauses 17-19 wherein the apparatus comprises a server and the device separate from the apparatus comprises a mobile device or cellular base station.

Clause 21. The apparatus of any of clauses 17-19 wherein the apparatus comprises a first mobile device and the device separate from the apparatus comprises a second mobile device.

Clause 22. The apparatus of any of clauses 17-21 wherein the means for determining the virtual RTK base station location comprises means for obtaining the virtual RTK base station location from a plurality of predetermined virtual RTK base station locations.

Clause 23. The apparatus of clause 22 wherein the plurality of predetermined virtual RTK base station locations are geographically distributed in grid pattern.

Clause 24. The apparatus of any of clauses 17-23 wherein the means for transmitting the RTK correction information comprises means for broadcasting the RTK correction information.

Clause 25. A non-transitory computer-readable medium storing instructions for providing Real Time Kinematic (RTK) correction information for Global Navigation Satellite Systems (GNSS)-based positioning, the instructions comprising code for: obtaining, at a first device, Precise Point Positioning (PPP) correction information; determining a virtual RTK base station location; generating a virtual Multi-Constellation Multi-Frequency (MCMF) measurement corresponding to the determined virtual RTK base station location, wherein the virtual MCMF measurement is based at least in part on the PPP correction information; and transmitting the RTK correction information with the first device, wherein the RTK correction information is based at least in part on the virtual MCMF measurement.

Clause 26. The computer-readable medium of clause 25, wherein the code for transmitting the RTK correction information comprises code for sending the RTK correction information to a second device.

Clause 27. The computer-readable medium of any of clauses 25-26 wherein the instructions further comprise code for receiving an indication of a location of the second device, wherein determining the virtual RTK base station location is based at least in part on the location of the second device.

Clause 28. The computer-readable medium of any of clauses 25-27 wherein the first device comprises a server and the second device comprises a mobile device or cellular base station.

Clause 29. The computer-readable medium of any of clauses 25-27 wherein the first device comprises a first mobile device and the second device comprises a second mobile device.

Clause 30. The computer-readable medium of any of clauses 25-29 wherein the code for determining the virtual RTK base station location comprises code for obtaining the virtual RTK base station location from a plurality of predetermined virtual RTK base station locations.

Clause 31. The computer-readable medium of clause 30 wherein the plurality of predetermined virtual RTK base station locations are geographically distributed in grid pattern.

Clause 32. The computer-readable medium of any of clauses 25-31 wherein the code for transmitting the RTK correction information comprises code for broadcasting the RTK correction information.

What is claimed is:

1. A method of providing Real Time Kinematic (RTK) correction information for Global Navigation Satellite Systems (GNSS)-based positioning, the method comprising:
    obtaining, at a first device, Precise Point Positioning (PPP) correction information;
    determining, by the first device, a virtual RTK base station location;
    generating, by the first device, based at least in part on the PPP correction information, a virtual Multi-Constellation Multi-Frequency (MCMF) measurement corresponding to the determined virtual RTK base station location, wherein the virtual MCMF measurement emulates a MCMF measurement generated by a reference station based on RTK correction information; and
    transmitting, by the first device, to a second device, the RTK correction information, wherein the RTK correction information is based at least in part on the virtual MCMF measurement generated by the first device.

2. The method of claim 1, wherein the PPP correction information is obtained by the first device from a PPP service provider, and wherein generating the MCMF measurement is a part of converting the PPP correction information to the RTK correction information that is useable by the second device.

3. The method of claim 1, further comprising receiving an indication of a location of the second device, wherein determining the virtual RTK base station location is based at least in part on the location of the second device.

4. The method of claim 1, wherein the first device comprises a server and the second device comprises a mobile device or cellular base station.

5. The method of claim 1, wherein the first device comprises a first mobile device and the second device comprises a second mobile device.

6. The method of claim 1, wherein determining the virtual RTK base station location comprises obtaining the virtual RTK base station location from a plurality of predetermined virtual RTK base station locations.

7. The method of claim 6, wherein the plurality of predetermined virtual RTK base station locations are geographically distributed in grid pattern.

8. The method of claim 1, wherein transmitting the RTK correction information comprises broadcasting the RTK correction information.

9. A device for providing Real Time Kinematic (RTK) correction information for Global Navigation Satellite Systems (GNSS)-based positioning, the device comprising:
a transceiver;
a memory; and
one or more processors communicatively coupled with the transceiver and the memory, wherein the one or more processors are configured to:
obtain Precise Point Positioning (PPP) correction information;
determine a virtual RTK base station location;
generate, based at least in part on the PPP correction information, a virtual Multi-Constellation Multi-Frequency (MCMF) measurement corresponding to the determined virtual RTK base station location, wherein the virtual MCMF measurement emulates a MCMF measurement generated by a base station based on RTK correction information; and
transmit the RTK correction information, wherein the RTK correction information is based at least in part on the virtual MCMF measurement.

10. The device of claim 9, wherein generating the MCMF measurement is a part of converting the PPP correction information to the RTK correction information that is useable by a second device.

11. The device of claim 10, wherein the one or more processors are further configured to receive an indication of a location of the second device and to determine the virtual RTK base station location based at least in part on the location of the second device.

12. The device of claim 10, wherein the device comprises a server and the second device comprises a mobile device or cellular base station.

13. The device of claim 10, wherein the device comprises a first mobile device and the second device comprises a second mobile device.

14. The device of claim 9, wherein, to determine the virtual RTK base station location, the one or more processors are configured to obtain the virtual RTK base station location from a plurality of predetermined virtual RTK base station locations.

15. The device of claim 14, wherein the plurality of predetermined virtual RTK base station locations are geographically distributed in grid pattern.

16. The device of claim 9, wherein, to transmit the RTK correction information, the one or more processors are configured to broadcast the RTK correction information.

17. An apparatus for providing Real Time Kinematic (RTK) correction information for Global Navigation Satellite Systems (GNSS)-based positioning, the apparatus comprising:
means for obtaining, at the apparatus, Precise Point Positioning (PPP) correction information;
means for determining a virtual RTK base station location;
means for generating, based at least in part on the PPP correction information, a virtual Multi-Constellation Multi-Frequency (MCMF) measurement corresponding to the determined virtual RTK base station location, wherein the virtual MCMF measurement emulates a MCMF measurement generated by a reference station based on RTK correction information; and
means for transmitting the RTK correction information with the apparatus, wherein the RTK correction information is based at least in part on the virtual MCMF measurement.

18. The apparatus of claim 17, wherein the means for transmitting the RTK correction information comprises means for sending the RTK correction information to a device separate from the apparatus.

19. The apparatus of claim 18, further comprising means for receiving an indication of a location of the device separate from the apparatus, wherein determining the virtual RTK base station location is based at least in part on the location of the device separate from the apparatus.

20. The apparatus of claim 18, wherein the apparatus comprises a server and the device separate from the apparatus comprises a mobile device or cellular base station.

21. The apparatus of claim 18, wherein the apparatus comprises a first mobile device and the device separate from the apparatus comprises a second mobile device.

22. The apparatus of claim 17, wherein the means for determining the virtual RTK base station location comprises means for obtaining the virtual RTK base station location from a plurality of predetermined virtual RTK base station locations.

23. The apparatus of claim 22, wherein the plurality of predetermined virtual RTK base station locations are geographically distributed in grid pattern.

24. The apparatus of claim 17, wherein the means for transmitting the RTK correction information comprises means for broadcasting the RTK correction information.

25. A non-transitory computer-readable medium storing instructions for providing Real Time Kinematic (RTK) correction information for Global Navigation Satellite Systems (GNSS)-based positioning, the instructions comprising code for:
obtaining, by one or more processors of a first device, Precise Point Positioning (PPP) correction information;
determining, by the one or more processors, a virtual RTK base station location;
generating, by the one or more processors, based at least in part on the PPP correction information, a virtual Multi-Constellation Multi-Frequency (MCMF) measurement corresponding to the determined virtual RTK base station location, wherein the virtual MCMF measurement emulates a MCMF measurement generated by a reference station based on RTK correction information; and
transmitting, by the one or more processors, the RTK correction information, wherein the RTK correction information is based at least in part on the virtual MCMF measurement.

26. The computer-readable medium of claim 25, wherein the code for transmitting the RTK correction information comprises code for sending the RTK correction information to a second device.

27. The computer-readable medium of claim 26, wherein the instructions further comprise code for receiving an indication of a location of the second device, wherein determining the virtual RTK base station location is based at least in part on the location of the second device.

28. The computer-readable medium of claim 26, wherein the first device comprises a server and the second device comprises a mobile device or cellular base station.

29. The computer-readable medium of claim 26, wherein the first device comprises a first mobile device and the second device comprises a second mobile device.

30. The computer-readable medium of claim 25, wherein the code for determining the virtual RTK base station location comprises code for obtaining the virtual RTK base station location from a plurality of predetermined virtual RTK base station locations.

31. The computer-readable medium of claim 30, wherein the plurality of predetermined virtual RTK base station locations are geographically distributed in grid pattern.

32. The computer-readable medium of claim 25, wherein the code for transmitting the RTK correction information comprises code for broadcasting the RTK correction information.

* * * * *